US012057285B2

(12) United States Patent
Calvey

(10) Patent No.: US 12,057,285 B2
(45) Date of Patent: Aug. 6, 2024

(54) ANNULAR GAP CATHODES WITH GRAPHITE CAPS

(71) Applicant: Kimball Physics, Inc., Wilton, NH (US)

(72) Inventor: George Douglas Calvey, Peterborough, NH (US)

(73) Assignee: KIMBALL PHYSICS, INC., Wilton, NH (US)

( * ) Notice: Subject to any disclaimer, the term of this patent is extended or adjusted under 35 U.S.C. 154(b) by 0 days.

(21) Appl. No.: 18/388,122

(22) Filed: Nov. 8, 2023

(65) Prior Publication Data

US 2024/0161993 A1 May 16, 2024

Related U.S. Application Data

(60) Provisional application No. 63/424,313, filed on Nov. 10, 2022.

(51) Int. Cl.

*H01J 1/15* (2006.01)
*H01J 1/148* (2006.01)
*H01J 9/04* (2006.01)

(52) U.S. Cl.

CPC ................ *H01J 1/15* (2013.01); *H01J 1/148* (2013.01); *H01J 9/04* (2013.01)

(58) Field of Classification Search

CPC ................ H01J 1/15; H01J 1/148; H01J 9/04
See application file for complete search history.

(56) References Cited

U.S. PATENT DOCUMENTS 4,486,684 A * 12/1984 Hohn ........................ H01J 1/16 313/337
4,661,741 A 4/1987 Valun et al.
6,132,278 A * 10/2000 Kang ...................... H01J 3/022 445/6
7,176,610 B2 * 2/2007 Katsap .................... H01J 9/042 445/51
9,165,737 B2 * 10/2015 Katsap ...................... H01J 1/14
9,299,525 B2 * 3/2016 Kobayashi .............. H01J 1/148

OTHER PUBLICATIONS

ES-423GR Guard Ribg LaB6 Cathode User Information, Kimball Physics, Inc., 2 pages; Retrieved from: https://www.kimballphysics.com/downloadable/download/sample/sample_id/1277/ (Accessed Dec. 2, 2028).

Antonovich, D. A., V. A. Gruzdev, and V. G. Zalesski. "Features of Electron Optical Systems with the Plasma Emitter Based on Stationary Double Electric Layers in the Plasma." Russian Physics Journal 63.10 (2021): 1713-1720.

* cited by examiner

*Primary Examiner* — Mary Ellen Bowman
(74) *Attorney, Agent, or Firm* — Hamilton, Brook, Smith & Reynolds, P.C.

(57) ABSTRACT

A cathode device including an emitter element for generating electrons. The emitter element can have an outer periphery and a distal tip. The tip can have a first angled surface that angles inwardly from the outer periphery, and a second angled surface that angles inwardly and is separated and inwardly offset from the first angled surface by a shoulder. A graphite cap which can be solid, extends around the emitter element and has an internal angled surface that engages the first angled surface of the tip of the emitter element, forming a gap of a controlled size separating the internal angled surface of the graphite cap from the second angled surface of the tip of the emitter element.

21 Claims, 10 Drawing Sheets

28
16c
26
S2
16, S1
16c
16, 16b
16a
A 18d
18b
18, 18a
16c
18c
16b
16a
L 16c
24
18b
18d
S1
S2
18, 18a
16,
16b
18c
30
16a
14b,
14
14a
L, A, B 24
32
18d
16c
30
18c
16,
16b
18, 18a
16a
14
L 12
24
19
28, 16c
P
18e
S2
S1
18,
18a
30
16,
16b
18c
16a
14
L 18b
18a
B
18
18c

18b
B
18d
18, 18a
.041
18c
Θ
419 microns

.045
18b
18a
18
B

B
Ø .021
18a
18
18c
8D
8D

ANNULAR GAP CATHODES WITH GRAPHITE CAPS

RELATED APPLICATION

This application claims the benefit of U.S. Provisional Application No. 63/424,313, filed on Nov. 10, 2022. The entire teachings of the above application are incorporated herein by reference.

BACKGROUND

High brightness thermionic cathodes often incorporate $LaB_6$ as the emission material.

SUMMARY $LaB_6$ (lanthanum hexaboride) emitters terminating in a truncated cone are used for applications requiring small source sizes. Emission from the flat surface atop the cone can be selected, and emission from the cone suppressed by controlling the electric fields in the vicinity of the cathode tip. However, higher brightness can be achieved by surrounding the emission flat with a high work function, electrically conductive material, such as carbon, manufactured coplanar to the emission flat. When operating at very high temperatures, carbon and $LaB_6$ interactions near the emission surface degrade the cathode, reducing its effective lifetime. This problem is eliminated by introducing an annular gap between the $LaB_6$ emission surface and the surrounding carbon.

The present disclosure can provide a cathode device with a controlled annular gap that enables high brightness, and long lifetime operation in electron optical systems. The cathode device can include an emitter element for generating electrons. The emitter element can have an outer periphery and a distal tip. The tip can have a first angled surface that angles inwardly from the outer periphery, and a second angled surface that angles inwardly and is separated and inwardly offset from the first angled surface by a shoulder. A graphite cap which can be solid, extends around the emitter element and has an internal angled surface that engages the first angled surface of the tip of the emitter element, forming a gap of a controlled size separating the internal angled surface of the graphite cap from the second angled surface of the tip of the emitter element.

In particular embodiments, the emitter element can be at least one of a $LaB_6$ and $CeB_6$ crystal having a round outer periphery. The graphite cap can have a round interior. The emitter element and the graphite cap can have respective flat distal ends separated by the gap. The flat distal end of the emitter element can have a diameter ranging from about 10-300 microns, and the gap can range in size from about 1-20 microns. The first and second angled surfaces can be respective first and second frustoconical surfaces, with the second frustoconical surface extending from a distal end of the first frustoconical surface. The first and second frustoconical surfaces of the tip of the emitter element each can have an exterior included angle ranging from about 45° to 120°. The shoulder can be about 1-20 microns wide. The internal angled surface of the graphite cap can form an internal female frustoconical surface and can have an interior included angle that has a same angle as the exterior included angles on the first and second frustoconical surfaces of the tip of the emitter element. The emitter element can be mounted to a heater. The graphite cap can have a generally cylindrical body with an opening at a proximal end for securement to an outer periphery of the heater. The internal female frustoconical surface can be at a distal end of the opening for engaging the first frustoconical surface of the tip of the emitter element.

The present disclosure can also provide a cathode device including an emitter element for generating electrons. The emitter element can have an outer periphery and a tip. The tip can have a first frustoconical surface that angles inwardly from the outer periphery, and a second frustoconical surface that angles inwardly and is separated and inwardly offset from the first frustoconical surface by a shoulder. The second frustoconical surface can extend from a distal end of the first frustoconical surface. A cap can extend around the emitter element and has an internal female frustoconical surface that engages the first frustoconical surface of the tip of the emitter element. The internal female frustoconical surface can have a same angle as the first and second frustoconical surfaces, forming a gap of a controlled size separating the internal female frustoconical surface of the cap from the second frustoconical surface of the tip of the emitter element.

The present disclosure can also provide a cathode device including an emitter element for generating electrons. The emitter element can have an outer periphery and an inwardly angled male tip. A graphite cap can extend around the emitter element and have an internal inwardly angled female surface that engages a proximal portion of the inwardly angled male tip of the emitter element. One of the emitter element and the graphite cap can have two angled surfaces separated and offset from each other by a shoulder, and the other of the emitter element and the graphite cap can have a single angled surface, thereby forming a gap of a controlled size separating a distal portion of the internal inwardly angled female surface of the graphite cap from a distal portion of the inwardly angled male tip of the emitter element.

The present disclosure can also provide a method of forming a cathode device including providing an emitter element for generating electrons. The emitter element can have an outer periphery and a distal tip. The tip can be formed with a first angled surface that angles inwardly from the outer periphery, and a second angled surface that angles inwardly and is separated and inwardly offset from the first angled surface by a shoulder. A graphite cap which can be solid, can be secured around the emitter element. The graphite cap can have an internal angled surface that engages the first angled surface of the tip of the emitter element, thereby forming a gap of a controlled size separating the internal angled surface of the graphite cap from the second angled surface of the tip of the emitter element.

In particular embodiments, the emitter element can be at least one of a $LaB_6$ and $CeB_6$ crystal having a round outer periphery. The graphite cap can have a round interior. The distal end of the cathode device can be polished to form the emitter element and the graphite cap with respective flat distal ends separated by the gap. The flat distal end of the emitter element can have a diameter ranging from about 10-300 microns, and the gap can range in size from about 1-20 microns. The first and second angled surfaces can be respective first and second frustoconical surfaces, with the second frustoconical surface extending from a distal end of the first frustoconical surface. The first and second frustoconical surfaces of the tip of the emitter element can each have an exterior included angle ranging from about 45° to 120°. The shoulder can be about 1-20 microns wide. The internal angled surface of the graphite cap can form an internal female frustoconical surface with an interior included angle that has a same angle as the exterior included angles on the first and second frustoconical surfaces of the tip of the emitter element. The emitter element can be mounted to a heater. The graphite cap can have a generally cylindrical body, with an opening at a proximal end for securement to an outer periphery of the heater. The internal female frustoconical surface can be a distal end of the opening for engaging the first frustoconical surface of the tip of the emitter element.

The present disclosure can also provide a method of forming a cathode device including providing an emitter element for generating electrons. The emitter element can have an outer periphery and an inwardly angled male tip. A graphite cap can be secured around the emitter element. The graphite cap can have an internal inwardly angled female surface that engages a proximal portion of the inwardly angled male tip of the emitter element. One of the emitter element and the graphite cap can have two angled surfaces separated and offset from each other by a shoulder, and the other of the emitter element and the graphite cap can have a single angled surface, thereby forming a gap of a controlled size separating a distal portion of the internal inwardly angled female surface of the graphite cap from a distal portion of the inwardly angled male tip of the emitter element.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Figure 1:
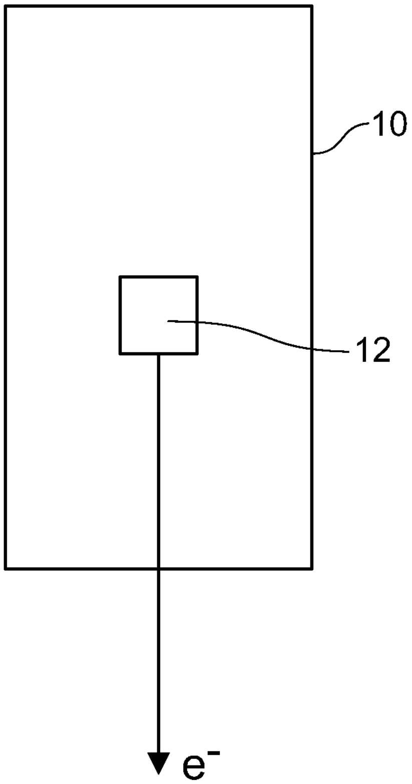
FIG. 1 is a schematic drawing of an electron emitter having a cathode device.
Figure 2A:
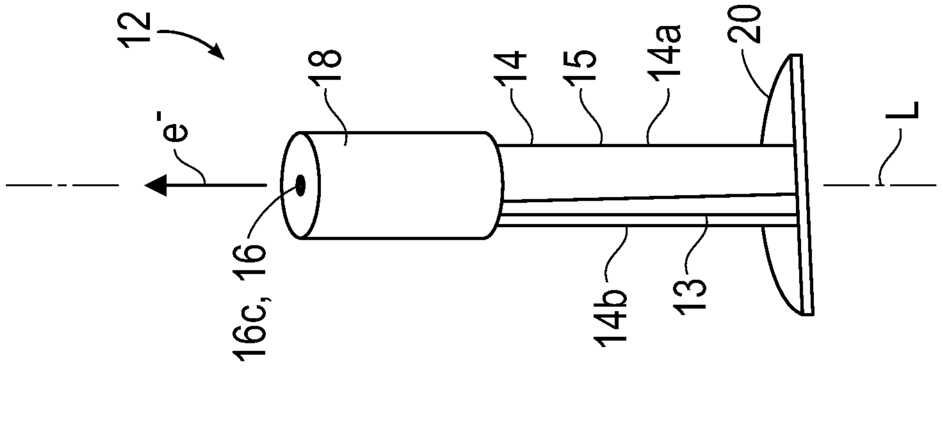
FIGS. 2A and 2B depict perspective and enlarged views of an embodiment of a cathode device in the present disclosure.
Figure 2B:
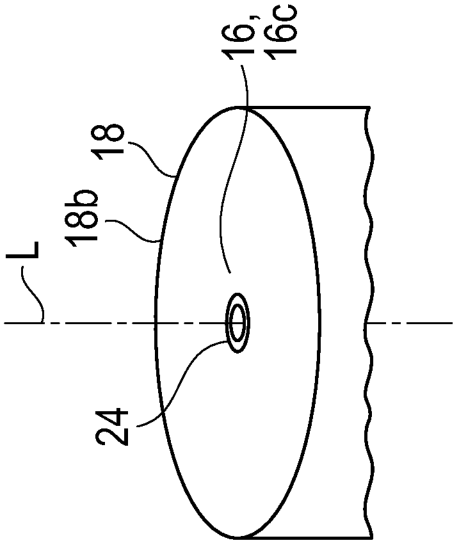
Figure 3:
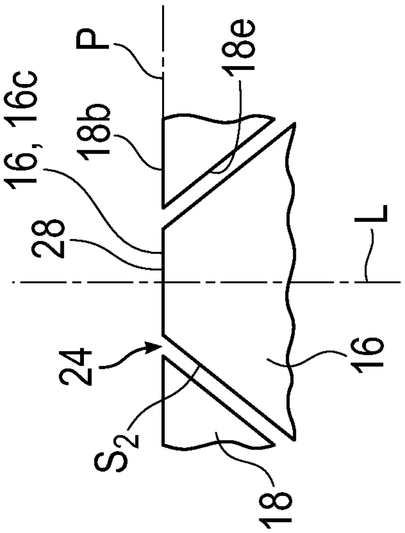
FIG. 3 is a sectioned view of a portion of FIG. 2B.

FIGS. 1-8D provide details of embodiments in the present disclosure. Referring to FIGS. 1-3, an electron emitter or gun 10 in the present disclosure can include a cathode device 12 for generating electrons $e^-$. The cathode device 12 can extend along a longitudinal axis L and include a heater such as a graphite or carbon heater 14, that supports an emitter tip or element 16 such as a $LaB_6$ (lanthanum hexaboride) crystal. The graphite heater 14 can have an elongate split rod portion 15 having a pair of elongate legs 14*a* and 14*b* separated by an elongate slot 13. In some embodiments, the crystal can be $CeB_6$ (cerium hexaboride). In some embodiments, the emitter element 16 can be considered a cathode element or an electron generator. The emitter element 16 can be surrounded by an emitter cap, housing or enclosure 18, such as an electrically conductive graphite or carbon cap (FIGS. 2A-6E and 8A-8D) that can be a single solid piece of carbon or graphite. The top or upper surfaces of the tip 18*b* of the graphite cap 18 and the tip 28 of the emitter element 16 can extend coplanar with each other, along a common surface plane P, and an angled or frustoconical gap 24 can separate the sidewalls of a distal portion of tip 16*c* of emitter element 16 from the graphite cap 18. The legs 14*a* and 14*b* of graphite heater 14 can be connected to a sub base 20 and electrically connected to electrical power via electrical lines or contacts 22 (FIGS. 6A-6C). The sub base 20 can be ceramic and the electrical contacts 22 can be tantalum D-strips that can extend laterally or radially outward from the sub base 20.

Figures 4A, 4B, 4C, 4D, 4E:
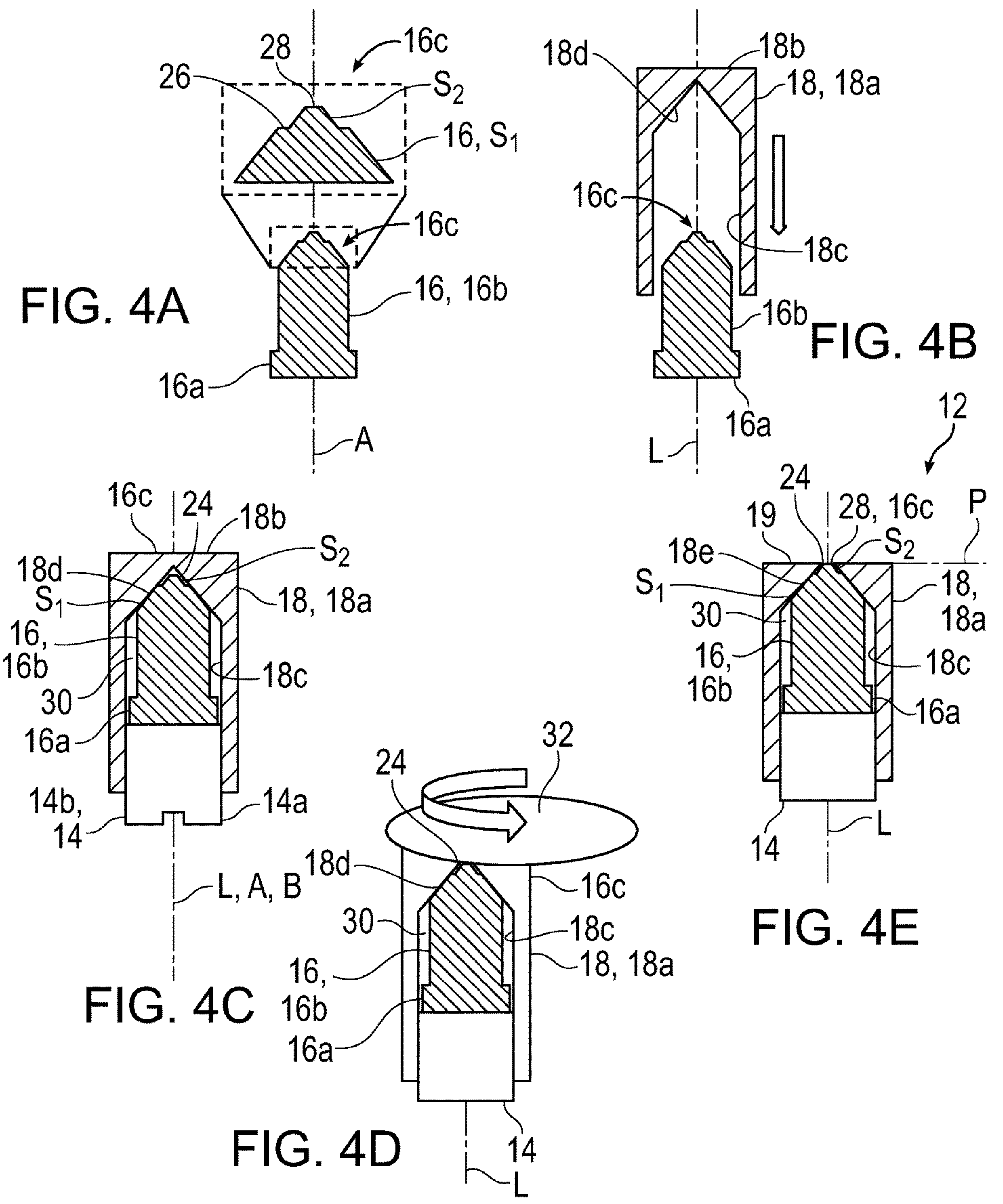
FIGS. 4A-4E depict manufacturing steps for an embodiment of the cathode device.
Figure 5B:
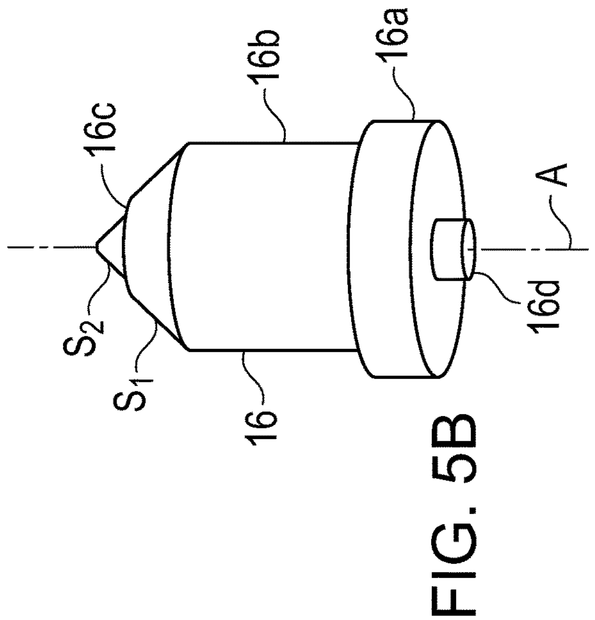
FIGS. 5A-5D depict features of an embodiment of the cathode device with FIG. 5A being a sectional view, FIG. 5B being a perspective view of an emitter element, FIG. 5C being a perspective view, and FIG. 5D being a top view.
Figure 5D:
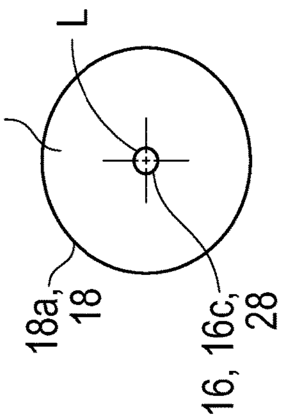
Figure 5C:
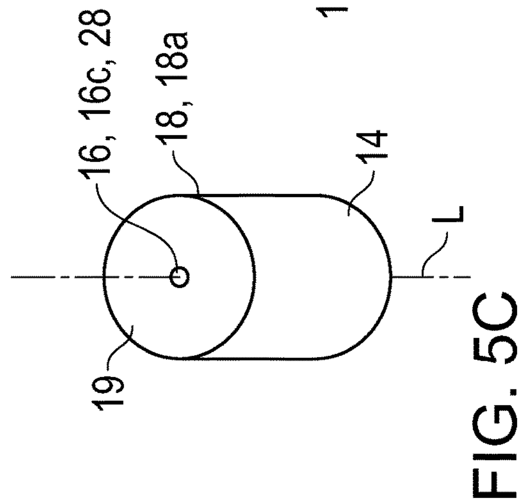
Figure 5A:
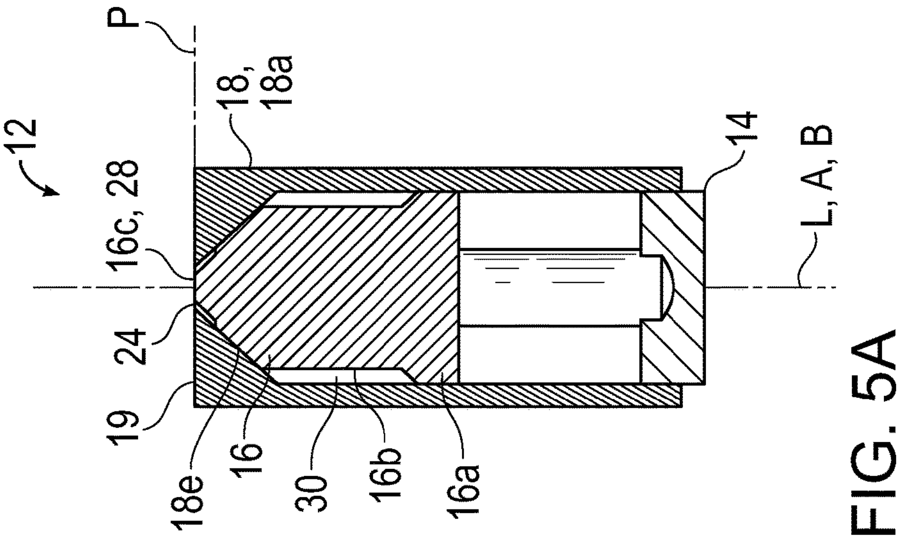

Referring to FIGS. 4A-5D, an embodiment of the cathode device 12 can be made by first forming a doubled angled concentric frustoconical tip 16*c* of the emitter element 16, such as by laser cutting (FIG. 4A). The double frustoconical tip 16*c* can have first or proximal $S_1$ and second or distal $S_2$ inwardly angled frustoconical surfaces concentrically offset from each other, with surface $S_2$ being distally positioned and smaller in outer diameter or periphery relative to surface $S_1$ to be inwardly recessed. The graphite cap 18 can be fitted around the emitter element 16, and initially have an internal female angled or conical surface 18*d* that engages the first or proximal surface $S_1$ of emitter element 16, and is secured to the graphite heater 14 in alignment along longitudinal axis L (FIGS. 4B and 4C). There can be a cylindrically annular gap 30 between the graphite cap 18 and the emitter element 16 in the cylindrical midsection of graphite cap 18. Initially when the graphite cap 18 is assembled around emitter element 16, the gap 24 around the distal surface $S_2$ of emitter element 16 can have an annular conical shape (FIG. 4C). The distal end of the cathode device 12 assembly can then be ground or polished flat with a grinding or polishing tool 32, simultaneously grinding the respective distal tips 18*b* and 28 of the graphite cap 18 and the emitter element 16 flat along a common plane P to form a polished distal end 19 and expose or form an inwardly angled frustoconical gap 24 between an internal female frustoconical angled surface 18*e* of graphite cap 18 and the distal angled frustoconical surface $S_2$ of emitter element 16 (FIG. 4D). The female conical surface 18*d* can be transformed into a female frustoconical surface 18*e* (FIG. 4E), and gap 24 can be formed into an annular frustoconical shape by the grinding. The debris can be removed to clear the gap 24 (sonicate). The amount of grinding or polishing of the distal end 18*b* of graphite cap 18 and tip 28 of emitter element 16 to become coplanar with each other along plane P can determine the size or diameter of the flat distal end of tip 28 of the emitter element 16, and can be in the range of 10-300 microns. By forming the frustoconical surfaces $S_1$ and $S_2$ as well as the annular shoulder 26 of the emitter element 16 by laser cutting, the offset between the surfaces $S_1$ and $S_2$ provided by the shoulder 26 can be precisely controlled and repeatable, for example within several microns. As a result, the gap 24 between the cap 18 and the second frustoconical surface $S_2$ of emitter element 16 can be precisely pre-measured before assembly, since the first frustoconical surface $S_1$ is engaged and mated in contact with the female conical or frustoconical surface 18*d*/18*e* of a graphite cap 18 having the same angle. The first surface $S_1$ spaces the female frustoconical surface 18*e* of graphite cap 18 away from the second surface $S_2$ a distance equaling the amount of the offset between the two surfaces $S_1$ and $S_2$ provided by shoulder 26.

The gap 24 at the distal end of cathode device 12 can extend along surface plane P between the tip 28 of emitter element 16 and the tip 18*b* of graphite cap 18, and by eliminating direct contact between the coplanar flat tip 28 and the tip 18*b*, can reduce chemical interaction between the flat of tip 28 and the graphite cap 18 that can degrade emission during use. This can allow for higher temperature operation and increased electron $e^-$ emission from the emitter element 16. The coplanar arrangement can also increase brightness of the electron emissions. This method of forming a controlled size annular gap 24 can be accomplished faster than prior methods and with controlled repeatability. As a result, degradation of the cathode device 12 due to heating during use can be reduced in a controllable manner and the size of the gap 24 can be pre-selected for the particular application.

Figure 6A:
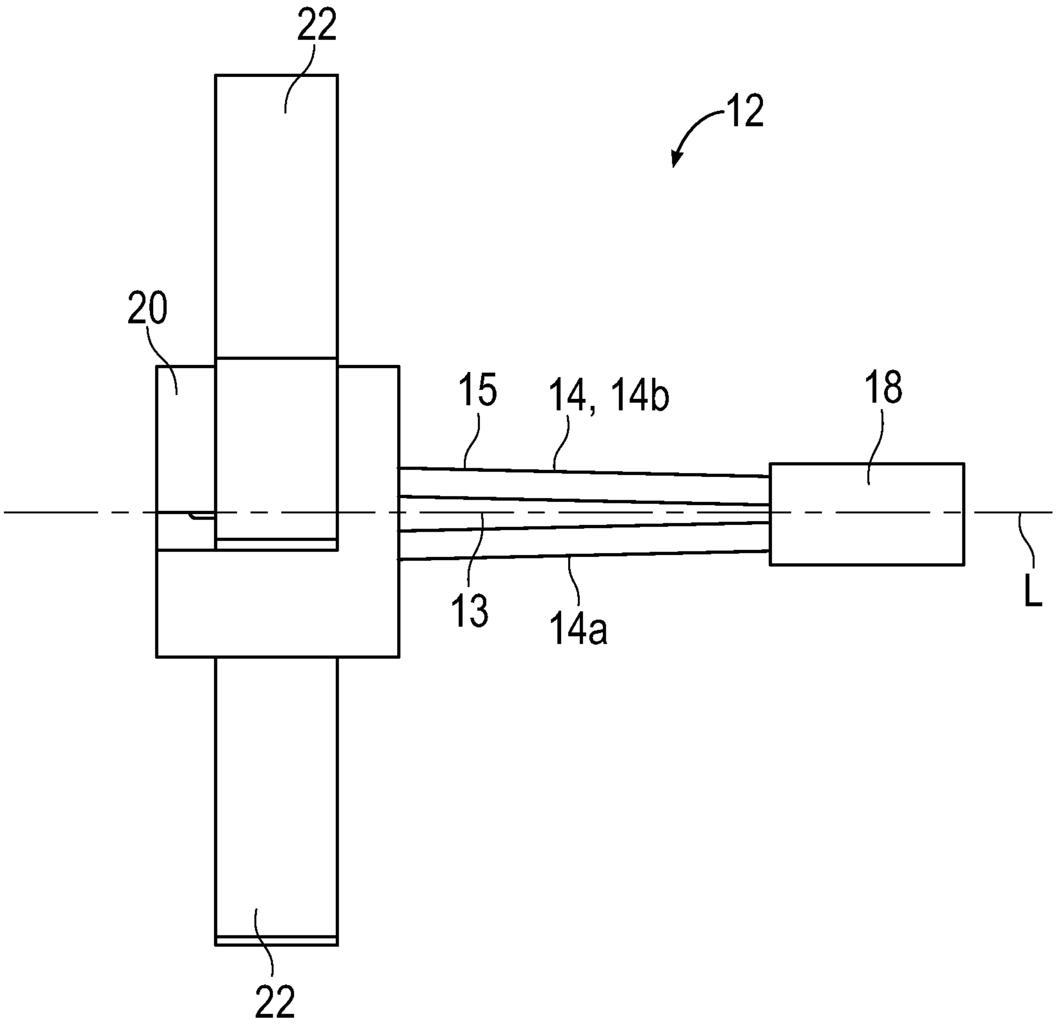
FIGS. 6A-6E are side, top and sectional views, as well as enlarged partial top and sectional views.
Figure 6C:
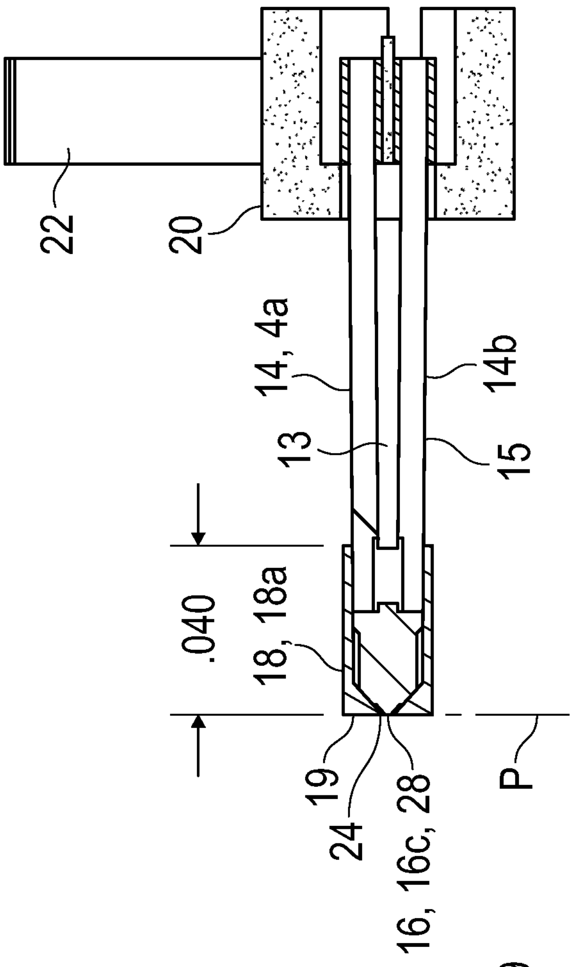
Figure 6B:
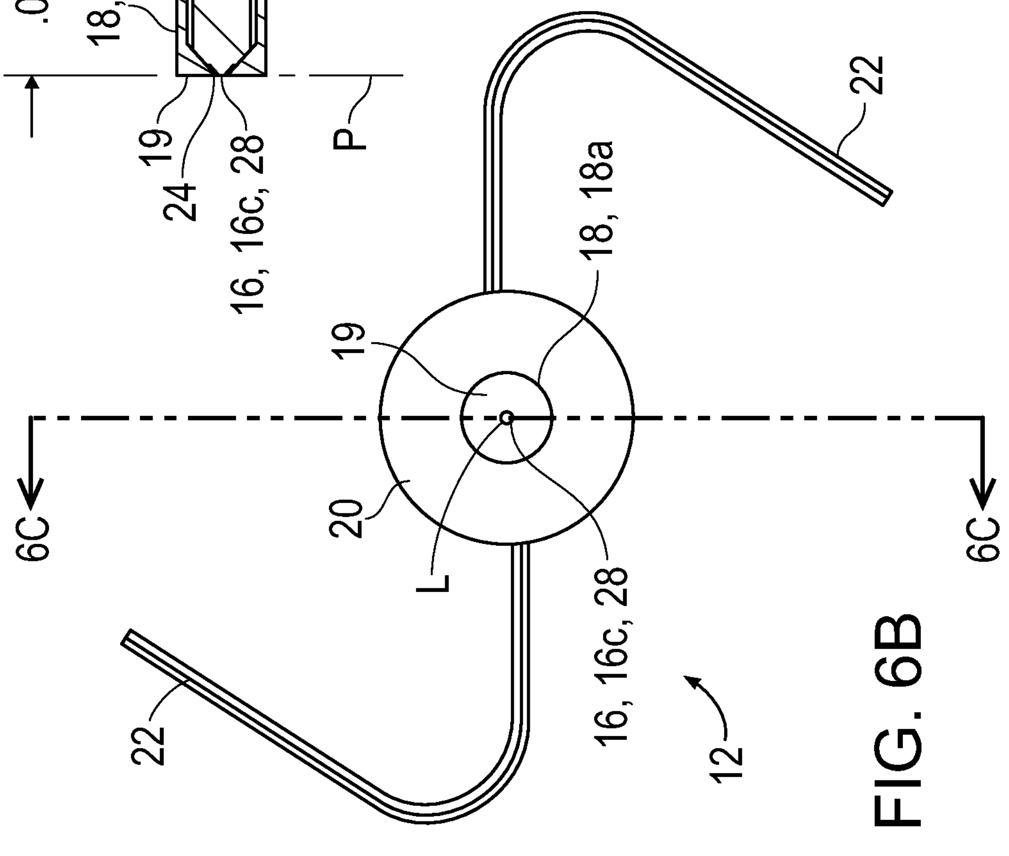
Figure 6D:
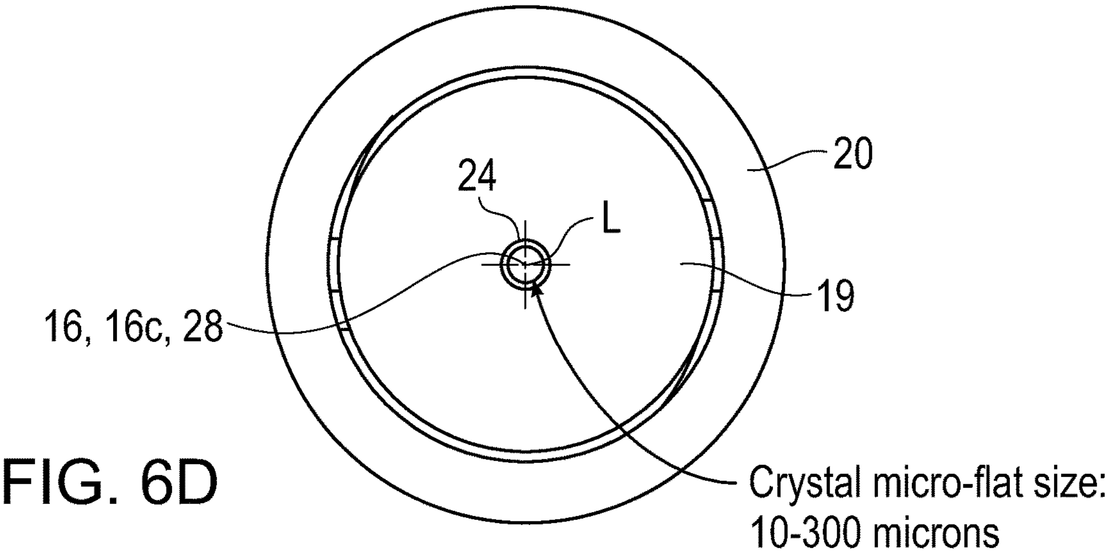
Figure 6E:
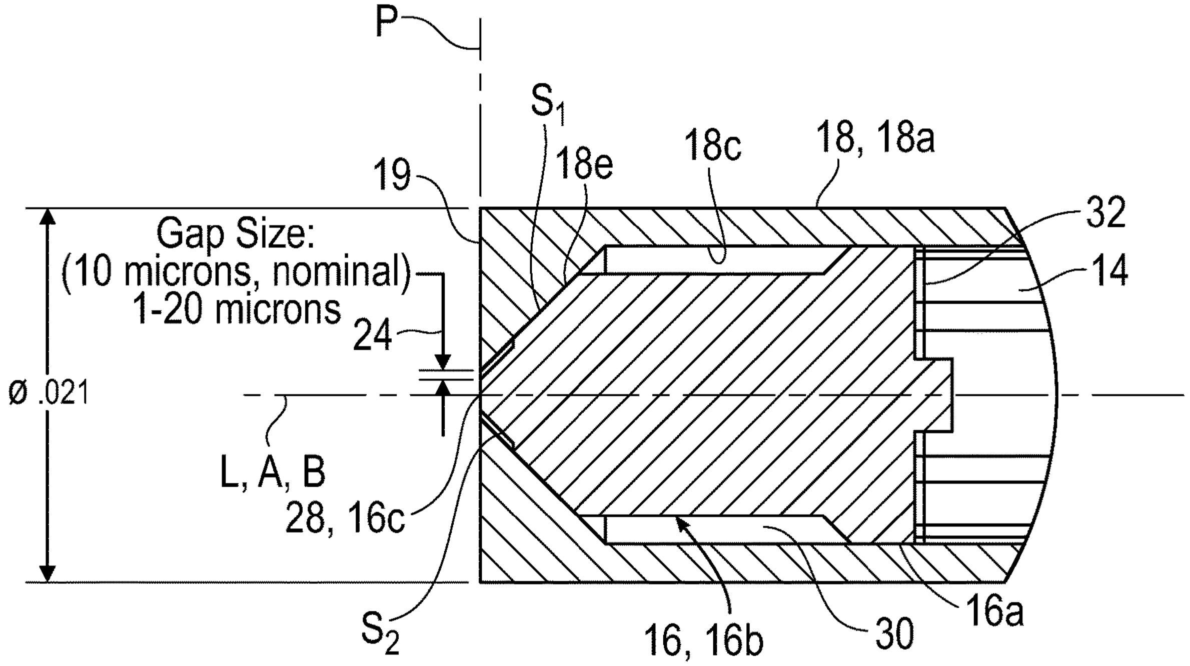
Figure 7A:
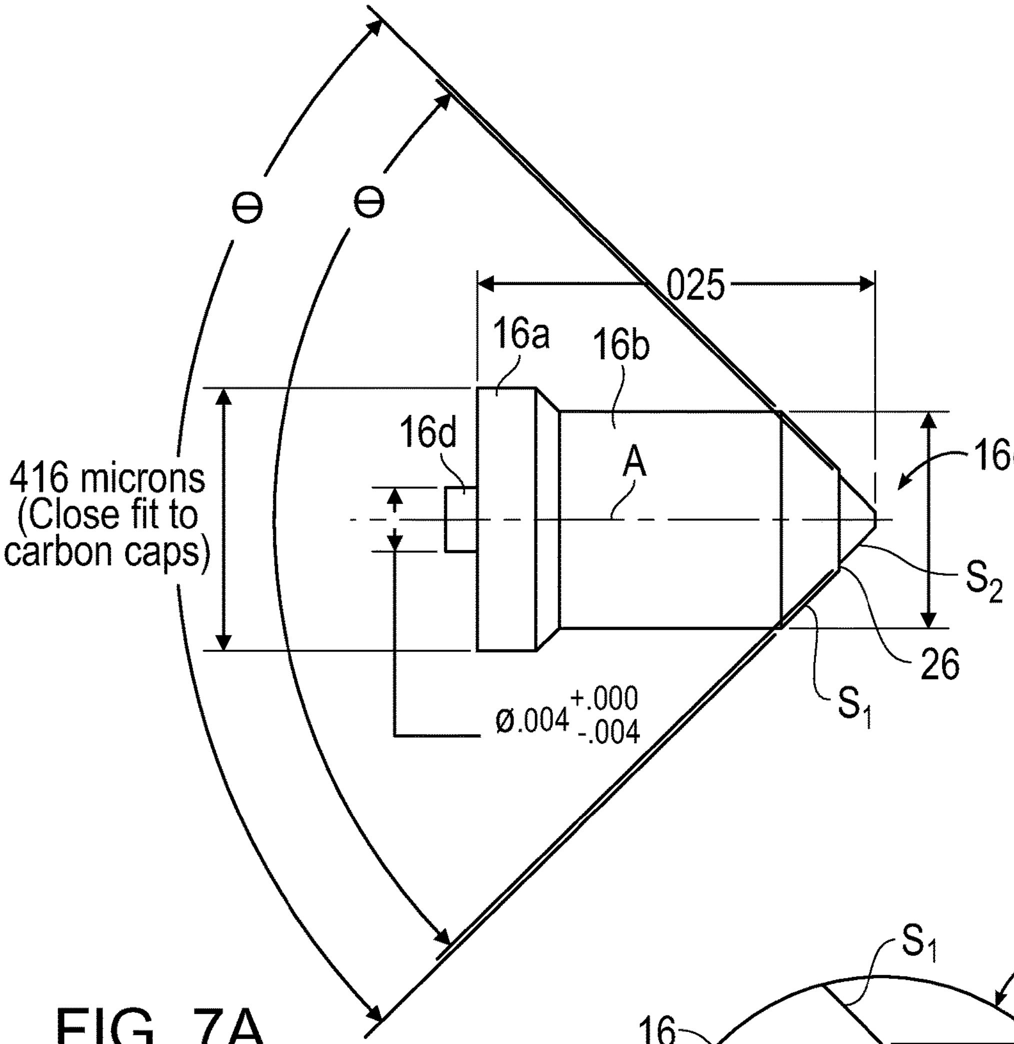
FIG. 7A is a side view of an embodiment of an emitter element and FIG. 7B is an enlarged portion thereof.
Figure 7B:
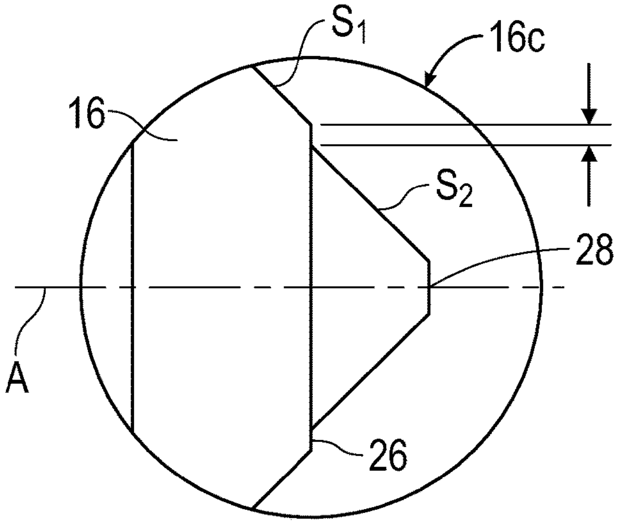
Figures 8A, 8B, 8C, 8D:
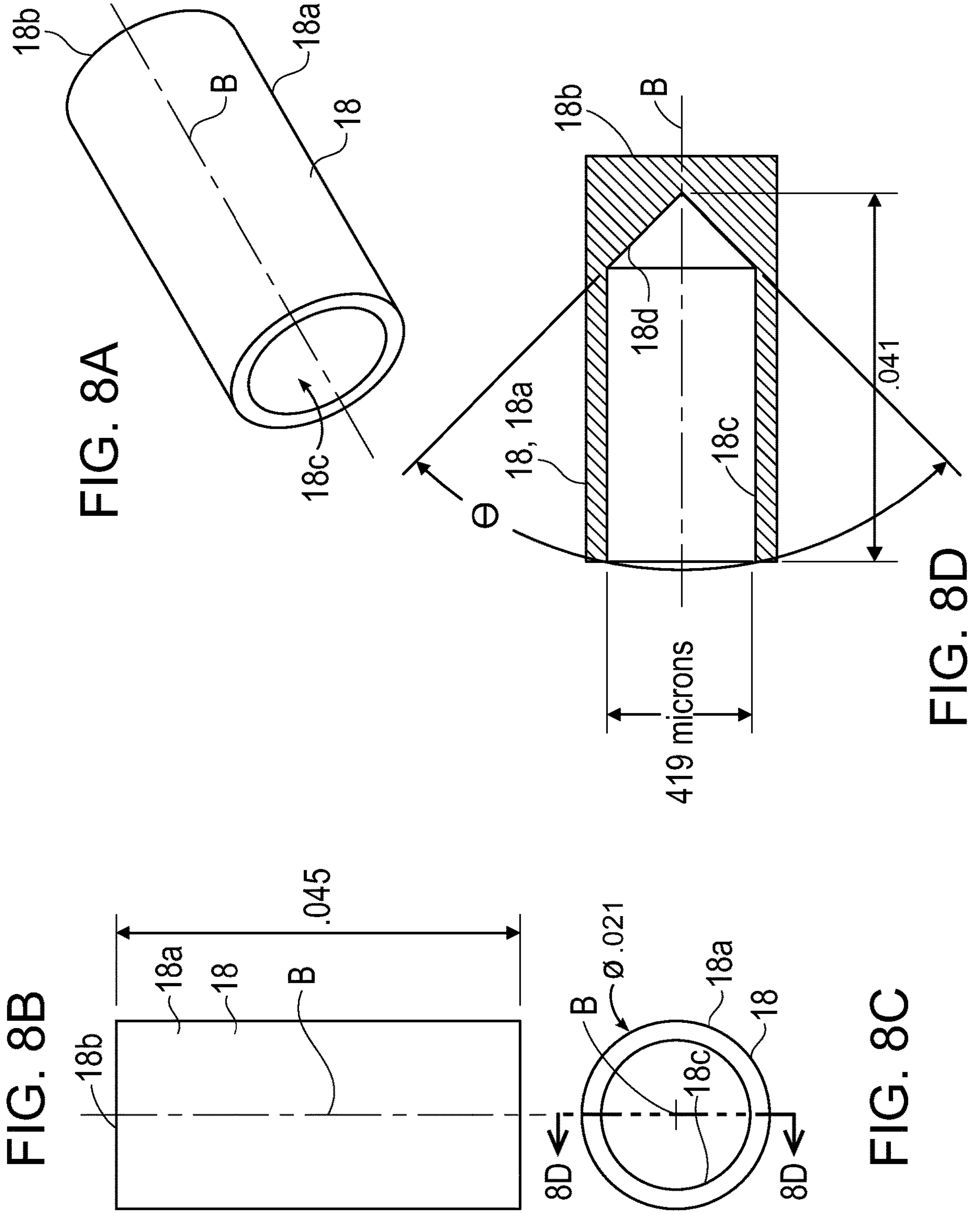
FIGS. 8A-8D are perspective, side, end and sectional views of an embodiment of an emitter cap.

Referring to FIGS. 7A and 7B, embodiments of the emitter element 16 can be round or generally cylindrical, and have a round or circular bottom flange or base 16*a* that can be about 416 microns in diameter, and a round or circular main body 16*b* with an outer periphery that can be about 345 microns in diameter. The emitter element 16 can be about 0.025 inches long in the longitudinal direction along central axis A prior to assembly, and have a sequentially stacked or stepped double angled frustoconical tip 16*c*, with a proximal first or outer inwardly angled frustoconical periphery surface $S_1$ and a distal second or inner inwardly angled frustoconical periphery surface $S_2$ concentrically positioned and recessed, offset or separated therefrom at the distal end. The first $S_1$ and second $S_2$ angled surfaces can angle inwardly moving in the distal direction, and can each be truncated cones or frustoconical in shape, and concentrically annular, curved, round or circular. The second angled frustoconical surface $S_2$ can be separated and inwardly offset or recessed from the first angled frustoconical surface $S_1$ by a flat annular shoulder 26 that can be about 1-20 microns wide, and in some embodiments can be about 10 microns wide. Choosing the size or width of the shoulder directly determines, chooses or corresponds to the size of the gap 24 to be the same size, and the gap 24 can be about 1-20 microns wide (for example 10 microns) between the second angled surface $S_2$ of the emitter element 16 and the interior angled female surface 18*d*/18*e* of the graphite cap 18, measured at the plane P normal to the plane (FIG. 6E). The first $S_1$ and second $S_2$ angled frustoconical surfaces can each have an angle θ which can be 90° included angles, or 45° from the central longitudinal axis L or central axis A, and can extend parallel to each other in offset fashion. In some embodiments, the first $S_1$ and second $S_2$ angled frustoconical surfaces can have 60° included angles, or be 30° from the central axis A. As a result, embodiments can have included angles that range from about 60°-90°. Additionally, other embodiments can have included angles that range from about 45°-120°. The first $S_1$ and second $S_2$ surfaces as well as other features of emitter element 16 can be formed by laser cutting. A stub 16*d* can extend from base 16*a*, remaining after the laser cutting process is finished, and can have a diameter of about 0.004 inches. Embodiments of the emitter element 16 can be shaped by manufacturing processes other than laser cutting, such as by grinding or electrical discharge machining (EDM).

Referring to FIGS. 6A-8D, embodiments of the graphite cap 18 can be generally cylindrical with an outer periphery, body or wall 18*a*, and made of a single or unitary piece of solid graphite or carbon. Prior to assembly, the graphite cap 18 can be about 0.021 inches in diameter by about 0.045 inches long in the longitudinal direction along a central axis B, and can have a hollow interior, hole or opening with a proximal round or circular inner surface or inner diameter 18*c* that can engage the outer base 16*a* diameter of the emitter element 16 and/or the outer periphery of heater 14, and a distal interior or internal angled female conical surface 18*d* that matches, mates and engages the first or proximal angled male frustoconical surface $S_1$ of the emitter element 16. The interior angled female conical surface 18*d* can have a 90° included angle, or can be 45° from the central axis B. Embodiments can have included angles ranging from 60°-90° as well as 45°-120°. Before assembly, the combined longitudinal length of the inner diameter 18*c* and the internal angled female conical surface 18*d* extending to the tip of the female conical surface 18*d* can be in some embodiments about 0.041 inches long. The graphite cap 18, the emitter element 16 and the heater 14 can be assembled so that axes A, B and L are all in alignment with each other. After the tip 18*b* of the graphite cap 18 and the tip 28 of the emitter element 16 are ground or polished to expose gap 24 surrounding distal angled frustoconical surface $S_2$, the female conical surface 18*d* is transformed into an internal female angled frustoconical surface 18*e*. The inner diameter 18*c* of graphite cap 18 can be about 419 microns and can be secured or bonded to the heater 14 and/or base 16*a* of emitter element 16 by adhesives. In some embodiments, the inner diameter 18*c* can have an interference or pressfit with the outer periphery of the heater 14 and/or base 16*a* of the emitter element 16 for securement. In other embodiments, a spacer disk 32 (FIG. 6E) can be positioned between the base 16*a* of emitter element 16 and the heater 14, and can improve life of the cathode device 12.

Figure 9:
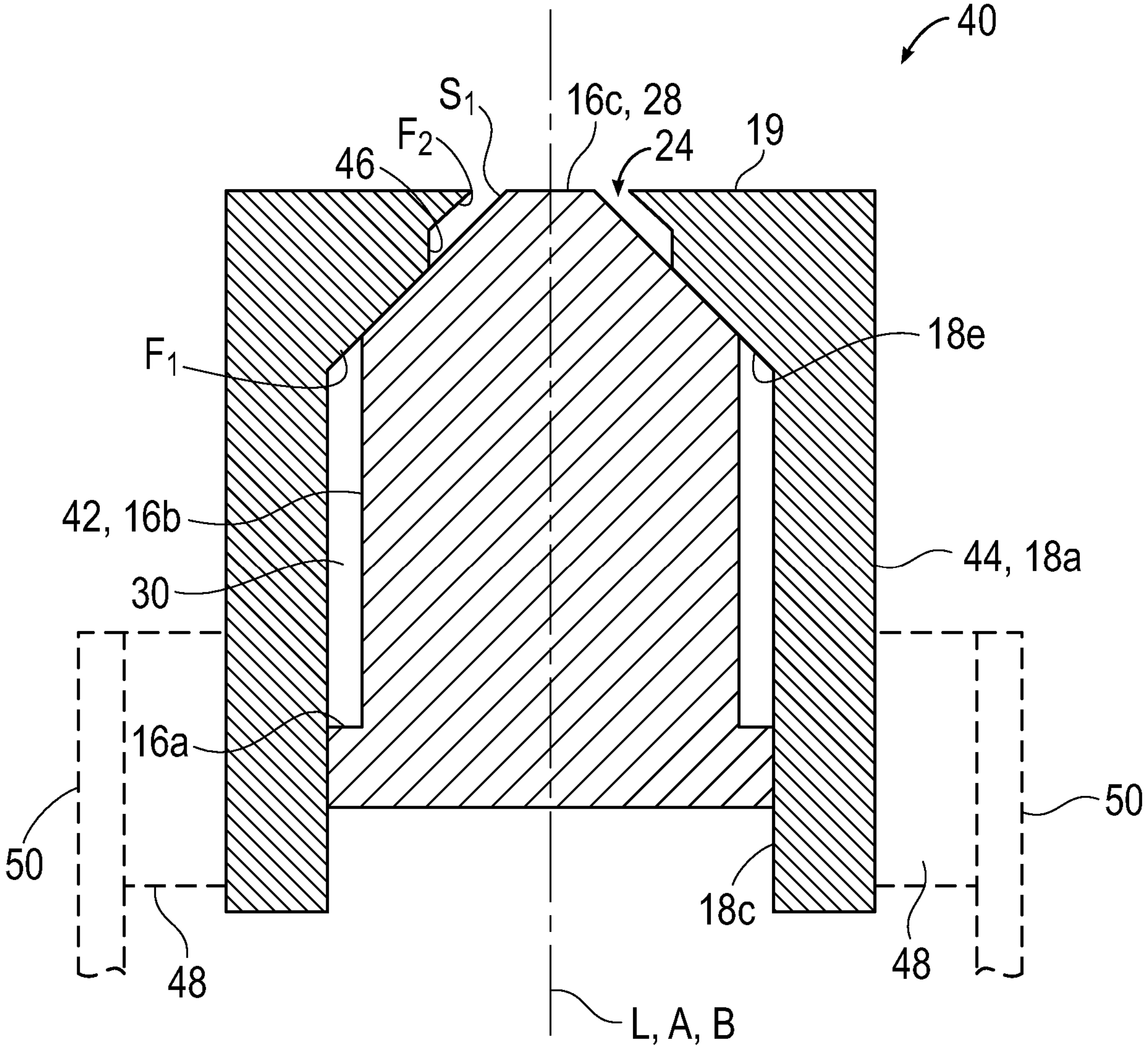
FIG. 9 is a sectional schematic view of another embodiment of a portion of a cathode device.

FIG. 9 depicts another embodiment of a cathode device 40 which differs from cathode device 12 in that emitter element 42 can have a single angled frustoconical tip 16*c* having only a single male inwardly angled frustoconical periphery surface $S_1$. The remaining structures of emitter element 42 can be similar to embodiments of emitter element 16. Graphite cap 44 can differ from graphite cap 18 in that graphite cap 44 can have an internal female stepped double angled concentric frustoconical surface 18*e*. The double frustoconical surface 18*e* can have first, outer or proximal $F_1$ and second, inner or distal $F_2$ inwardly angled internal female frustoconical surfaces axially offset from each other, with the outer periphery or diameter of surface $F_2$ being distally offset from the inner periphery or diameter of surface $F_1$ by an axial or axially extending spacer shoulder, bore or diameter 46 therebetween. The first $F_1$ and second $F_2$ surfaces can form outer and inner concentric annular angled female surfaces. When the graphite cap 44 is assembled to the emitter element 42, the first or proximal surface $F_1$ mates, engages or contacts the surface $S_1$ of emitter element 42 and spaces the second or distal surface $F_2$ of the distal portion of surface 18*e* away from the distal portion of surface $S_1$ to form an annular inwardly angled frustoconical gap 24 therebetween. By forming the double angled female surfaces $F_1$ and $F_2$ with a stepped drill bit or grinding wheel having a predetermined desired shape, configuration and dimensions, the size and shape of the gap 24 can be controlled with precision and repeatability. The axial length of axial shoulder 46 can be about 1-20 microns, and the surfaces $S_1$, $F_1$ and $F_2$ can have the same included angles as described for cathode device 12.

Although the emitter elements 16/42 and graphite caps 18/44 have been described to have angled surfaces $S_1$/$F_1$ and $S_2/F_2$, in some embodiments, other shapes can be used. For example, the emitter element 16 can have curved first $S_1$ and second $S_2$ surfaces offset or separated by an annular shoulder 26, extending in concentric relation to each other, and the interior surface 18*d*/18*e* of the graphite cap 18 can have a mating curved surface for engaging the first surface $S_1$. In other embodiments, the first $S_1$ and second $S_2$ surfaces do not have to have a round or circular periphery, but can have a series of flat angled faces or facets forming the surfaces $S_1$ and $S_2$, and the interior surface 18*d*/18*e* of the graphite cap 18 can be shaped similarly. In addition, the annular shoulder 26 does not have to be flat, but in some embodiments can have other suitable shapes, including being curved, rounded or angled. Similar shapes can be employed for surfaces $S_1$, $F_1$ and $F_2$ and shoulder 46 of graphite cap 44 and emitter element 42. Furthermore, the emitter elements 16/42 can have a base 16*a* and/or main body 16*b* that does not have to be round, for example can be rectangular, or can have lobes or protrusions for press fitting into graphite caps 18/44. In some embodiments, the proximal end of the graphite cap 18/44 does not have to be attached to heater 14, but instead the graphite cap 18/44 or the emitter element 16/42 can be laterally clamped between two blocks of pyrolytic graphite 48 between pincer mounts 50 (FIG. 9). Although particular mounts have been shown and described, it is understood that various suitable mounts can be employed for mounting the graphite caps and emitter elements in the present disclosure.

While example embodiments have been particularly shown and described, it will be understood by those skilled in the art that various changes in form and details may be made therein without departing from the scope of the embodiments encompassed by the appended claims. Although particular dimensions have been described, dimensions can vary depending upon the situation at hand. In addition, various features of the different embodiments can be combined together an/or omitted.

What is claimed is:

1. A cathode device comprising:

an emitter element for generating electrons, the emitter element having an outer periphery and a tip, the tip having a first angled surface that angles inwardly from the outer periphery, and a second angled surface that angles inwardly and is separated and inwardly offset from the first angled surface by a shoulder; and a graphite cap that extends around the emitter element and has an internal angled surface that engages the first angled surface of the tip of the emitter element, forming a gap of a controlled size separating the internal angled surface of the graphite cap from the second angled surface of the tip of the emitter element.

2. The cathode device of claim 1 in which the emitter element is at least one of a $LaB_6$ and $CeB_6$ crystal and has a round outer periphery, and the graphite cap has a round interior.

3. The cathode device of claim 2 in which the emitter element and the graphite cap have respective flat distal ends separated by the gap, the flat distal end of the emitter element having a diameter ranging from about 10-300 microns, and the gap ranging in size from about 1-20 microns.

4. The cathode device of claim 1 in which the first and second angled surfaces are respective first and second frustoconical surfaces with the second frustoconical surface extending from a distal end of the first frustoconical surface.

5. The cathode device of claim 4 in which the first and second frustoconical surfaces of the tip of the emitter element each have an exterior included angle ranging from about 45°-120°.

6. The cathode device of claim 5 in which the shoulder is about 1-20 microns wide.

7. The cathode device of claim 5 in which the internal angled surface of the graphite cap forms an internal female frustoconical surface with an interior included angle that has a same angle as the exterior included angles on the first and second frustoconical surfaces of the tip of the emitter element.

8. The cathode device of claim 7 in which the emitter element is mounted to a heater.

9. The cathode device of claim 8 in which the graphite cap has a generally cylindrical body with an opening at a proximal end for securement to an outer periphery of the heater, and the internal female frustoconical surface being at a distal end of the opening for engaging the first frustoconical surface of the tip of the emitter element.

10. A cathode device comprising:

an emitter element for generating electrons, the emitter element having an outer periphery and a tip, the tip having a first frustoconical surface that angles inwardly from the outer periphery, and a second frustoconical surface that angles inwardly and is separated and inwardly offset from the first frustoconical surface by a shoulder, the second frustoconical surface extending from a distal end of the first frustoconical surface; and a cap that extends around the emitter element and has an internal female frustoconical surface that engages the first frustoconical surface of the tip of the emitter element, the internal female frustoconical surface having a same angle as the first and second frustoconical surfaces, forming a gap of a controlled size separating the internal female frustoconical surface of the cap from the second frustoconical surface of the tip of the emitter element.

11. A cathode device comprising:

an emitter element for generating electrons, the emitter element having an outer periphery and an inwardly angled male tip; and a graphite cap that extends around the emitter element and has an internal inwardly angled female surface that engages a proximal portion of the inwardly angled male tip of the emitter element, one of the emitter element and the graphite cap having two angled surfaces separated and offset from each other by a shoulder, and the other of the emitter element and the graphite cap having a single angled surface, thereby forming a gap of a controlled size separating a distal portion of the internal inwardly angled female surface of the graphite cap from a distal portion of the inwardly angled male tip of the emitter element.

12. A method of forming a cathode device comprising:

providing an emitter element for generating electrons, the emitter element having an outer periphery and a tip, the tip being formed with a first angled surface that angles inwardly from the outer periphery, and a second angled surface that angles inwardly and is separated and inwardly offset from the first angled surface by a shoulder; and securing a graphite cap around the emitter element, the graphite cap having an internal angled surface that engages the first angled surface of the tip of the emitter element, thereby forming a gap of a controlled size separating the internal angled surface of the graphite cap and the second angled surface of the tip of the emitter element.

13. The method of claim 12 in which the emitter element is at least one of a $LaB_6$ and $CeB_6$ crystal and has a round outer periphery, and the graphite cap has a round interior.

14. The method of claim 13 further comprising polishing a distal end of the cathode device to form the emitter element and the graphite cap with respective flat distal ends separated by the gap, the flat distal end of the emitter element having a diameter ranging from about 10-300 microns, and the gap ranging in size from about 1-20 microns.

15. The method of claim 12 in which the first and second angled surfaces are respective first and second frustoconical surfaces, with the second frustoconical surface extending from a distal end of the first frustoconical surface.

16. The method of claim 15 in which the first and second frustoconical surfaces of the tip of the emitter element each have an exterior included angle ranging from about 45°-120°.

17. The method of claim 16 in which the shoulder is about 1-20 microns wide.

18. The method of claim 16 in which the internal angled surface of the graphite cap forms an internal female frustoconical surface with an interior included angle that has a same angle as the exterior included angles on the first and second frustoconical surfaces of the tip of the emitter element.

19. The method of claim 18 further comprising mounting the emitter element to a heater.

20. The method of claim 19 in which the graphite cap has a generally cylindrical body with an opening at a proximal end for securement to an outer periphery of the heater, and the internal female frustoconical surface being at a distal end of the opening for engaging the first frustoconical surface of the tip of the emitter element.

21. A method of forming a cathode device comprising:

providing an emitter element for generating electrons, the emitter element having an outer periphery and an inwardly angled male tip; and securing a graphite cap around the emitter element, the graphite cap having an internal inwardly angled female surface that engages a proximal portion of the inwardly angled male tip of the emitter element, one of the emitter element and the graphite cap having two angled surfaces separated and offset from each other by a shoulder, and the other of the emitter element and the graphite cap having a single angled surface, thereby forming a gap of a controlled size separating a distal portion of the internal inwardly angled female surface of the graphite cap from a distal portion of the inwardly angled male tip of the emitter element.

* * * * *